United States Patent
Terry

(10) Patent No.: US 12,049,563 B1
(45) Date of Patent: *Jul. 30, 2024

(54) SYSTEM AND METHODS FOR AUTOMATICALLY TRACKING SEAFOOD

(71) Applicant: Shellfish Solutions, Winchester, MA (US)

(72) Inventor: Wyllys Terry, Winchester, MA (US)

( * ) Notice: Subject to any disclaimer, the term of this patent is extended or adjusted under 35 U.S.C. 154(b) by 58 days.

This patent is subject to a terminal disclaimer.

(21) Appl. No.: 17/894,550

(22) Filed: Aug. 24, 2022

Related U.S. Application Data

(63) Continuation of application No. 17/469,746, filed on Sep. 8, 2021.

(51) Int. Cl.
| | |
|---|---|
| *C08L 77/06* | (2006.01) |
| *C08L 77/02* | (2006.01) |
| *H01Q 1/02* | (2006.01) |
| *H01Q 1/42* | (2006.01) |

(52) U.S. Cl.
CPC ............... *C08L 77/06* (2013.01); *C08L 77/02* (2013.01); *H01Q 1/02* (2013.01); *H01Q 1/421* (2013.01); *C08L 2203/20* (2013.01); *C08L 2203/30* (2013.01); *C08L 2205/025* (2013.01)

(58) Field of Classification Search
CPC .. G06Q 10/0833; G06Q 30/018; G06K 1/121; G06K 7/1417; G06F 40/174
See application file for complete search history.

(56) References Cited

U.S. PATENT DOCUMENTS

| | | |
|---|---|---|
| 8,756,124 B1 | 6/2014 | Sayers, III et al. |
| 2003/0236768 A1 | 12/2003 | Sribhibhadh et al. |
| 2016/0243850 A1 | 8/2016 | Phillips et al. |
| 2021/0035240 A1 | 2/2021 | Echols |

*Primary Examiner* — Laura A Gudorf
(74) *Attorney, Agent, or Firm* — Lambert Shortell & Connaughton; David J. Connaughton, Jr.; Justin P. Tinger

(57) ABSTRACT

A system and method for tracking harvested seafood products including generating regulatory tags that include visual regulatory data as well as a QR Code that is used as an access point to both retrieve and upload additional information including both regulatory and non-regulatory data from a remote database. The tracking method and system include the ability to update in real-time the food consumption recommendations for any given seafood product.

23 Claims, 8 Drawing Sheets

400

SYSTEM AND METHODS FOR AUTOMATICALLY TRACKING SEAFOOD

CROSS-REFERENCED TO RELATED APPLICATIONS

This application is a continuation of U.S. patent application Ser. No. 17/469,746 filed on Sep. 8, 2021, and which claims the benefit of U.S. Patent Application 63/075,373 filed on Sep. 8, 2020, which are all herein incorporated by reference in their entirety.

COPYRIGHT STATEMENT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

1. Field of the Invention

The present invention relates to tracking regulatory and non-regulatory seafood farming, harvesting and distribution.

2. Description of the Prior Art

Present techniques for tracking seafood such as finfish, crustaceans, sea vegetables, and shellfish (oysters, clams, mussels, scallops, geoducks and other bivalves) as they change hands is historically done through handwritten tags, from which information is manually entered. These techniques are prone to errors as users transcribe Key Data Elements about the harvest, shipment and processing from the farmer/harvester, through one or more distributors and to the end seller, (such as a grocery store or restaurant). The chain of custody could involve several handwritten tags, shipping/receiving logs, and manually entered information, which at times gets entered into databases long after the seafood product has been shipped or even consumed. Thus, the ability to organize or lose tags is a real concern. This is particularly concerning for reducing the time for any necessary traceback operations.

In addition, there is a growing desire for consumers to understand additional information about the seafood they are consuming similar to that of wines and other alcohol that include things such as tasting notes, farming techniques, information about life cycle of that particular seafood and so forth. Seldom is this consumer information transferred with the seafood product. The present application and embodiments seek to improve upon the current systems, solve the above problems and create beneficial experiences for the farmer/harvester, distributor, and end consumer.

SUMMARY

In one embodiment a method for tracking harvested seafood product comprises the steps of: receiving via a first networked computing device: harvesting location information associated with the harvested seafood product, regulatory data associated with the harvested seafood product, wherein the regulatory data to be received is determined based on the harvesting location, and non-regulatory data associated with the harvested seafood product. Then generating a first tag using a printer, wherein the first tag displays at least a portion of the regulatory information and a QR Code that is connected to a database that includes both the regulatory information as well as the non-regulatory information associated with the harvested seafood product. From this step another user can receive the first tag at a second location, scan the QR code of the received first tag with a second networked computing device, which can then display for input on the second networked computing device fields for additional regulatory information. Once entered the regulatory information can be uploaded to the database to be associated with the harvested seafood product. Next a second tag can be generated, wherein the second tag includes at least a portion of the additional regulatory information and the QR Code from the first tag. This second tag can be received and the QR code scanned with a third networked computing device, wherein the regulatory and non-regulatory information associated with the harvested product can be displayed on the third networked computing device. The number of potential steps in the chain could be unlimited each being trackable in similar manner.

Additionally, to the embodiment above can include a step of accessing a database of required regulatory information based on manual entry, GPS location or IP address location associated with the first networked computing device.

Another step to the above embodiment can include storing in the database time and location information associated with the scanned first tag, second tag, or third tag each time the QR code is scanned.

In some variations of the above embodiment the step of automatically gathering and uploading to the database can include at least one of: environmental data, sensor data and weather data associated with the time and location of the scanning.

Another step to the above can include automatically sending to a first user associated with generating the first tag a notification when the QR code of the first tag has been scanned.

In some versions of the above can include utilizing a networked computer system to automatically tracking shipping and receiving information associated with the harvested seafood product, wherein the shipping and receiving data is also associated with each user in a supply chain and wherein a periodic report can be generated for each user in the supply chain for each harvested seafood product handled during a specified period of time.

Non-regulatory information can include at least one of: Flavor Profile Data, Farm Profile Data, Images or Videos of the farm or product, and Shipping Profile Data.

Non-regulatory information can also include consumable information associated with the harvested seafood product. The consumable information can include recommendations on whether the harvested seafood product can be consumed raw, whether the harvested seafood product should be cooked, or whether the harvested seafood product should not be consumed. The consumable information can be pulled from the database and the database can be updated by a supply-chain user or regulatory user.

In other variations to the above, once the QR code is scanned it triggers a release of information from the database associated with the harvested seafood product, but that release of information can be dependent on the type of user scanning the QR code and their permissions to access certain information, some of which is public, some of which is regulatory and some of which is related to the supply-chain users. Again, some user types include: supply-chain user, regulatory user, and consumer user.

As noted, and further expounded once the consumer user scanning the QR code causes the database to release only non-regulatory information associated with the harvested seafood product. Whereas, the supply-chain user scanning the QR code causes the database to release regulatory and non-regulatory information associated with the harvested seafood product upon verifying the supply-chain user's credentials. In accordance with current business practices and in a preferred embodiment, supply-chain users see only "1 step" back in the supply chain and regulatory harvest information. They do not have visibility to other steps in the chain. Regulators have an immediate view of the entire supply chain.

The consumer user can input comments or ratings to be associated with at least one of: the type of seafood, the harvester of seafood, the retailer of the seafood which is then stored in the database and further associated future harvested seafood product that is associated with the same type, harvester or retailer.

In another embodiment a computer implemented system for tracking harvested seafood comprises: a networked computer having non-volatile memory configured to execute tasks; and a database connected to the networked computer, wherein the networked computer is configured to execute the following tasks: receiving via an input portal harvesting location information associated with the harvested seafood product, requesting regulatory data to be associated with the harvested seafood product, wherein the requested regulatory data is determined based on the harvesting location information, recording received regulatory data into the database and generating an immutable lot code to be associated therewith, associating non-regulatory data associated with the harvested seafood product, generating a unique lot code to be associated with the harvested seafood product, and generating a QR code to be associated with the harvested seafood product to be printed onto a tag.

The computer implemented system upon a user scanning the QR Code in the networked computer can further execute a function to determine whether the user is a supply-chain user, regulatory user or consumer user.

The computer implemented system upon determining the type of user scanning the QR coded associated with the harvested seafood product, retrieves user appropriate information and generates user-appropriate fields for additional input to be associated with the harvested seafood.

For example, if the type of user is a supply-chain user, the networked computer automatically sends receipt information to any supply-chain user upstream in the distribution channel of the harvested seafood and records such information in the database.

The computer implemented system for tracking harvested seafood can also be further configured to automatically retrieve approved shippers list information from an external interstate shipper database based on entered shipping information.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION

Reference will now be made to the exemplary embodiments illustrated, and specific language will be used herein to describe the same. It will nevertheless be understood that no limitation of the scope of the invention is thereby intended. An initial overview of technology embodiments is provided below and then specific technology embodiments are described in further detail later. For example, shellfish tracking should not be construed to be limited to only shellfish, but can include many types of seafood and other aqua-farmed or fished products where regulatory tracking is required.

As discussed above, the current state of the art related to tracking information from farmer to end consumer primarily consists of manually writing by hand physical tags to be placed on containers of shellfish. The tags are then recorded manually at the next point in the distribution chain, and a new tag is generated, manually written on and sent to the next point along the chain. This manual writing and transferring of tag information can be cumbersome and fraught with opportunity for errors. The National Shellfish Sanitation Program's Model Ordinance provides the baseline regulations for shellfish that travel across state lines or are imported from other countries. These regulations require harvester and dealer tags on every lot of shellfish and as the shellfish lots change custody, those tags shall be removed and kept for at least 90 days and ordered chronologically, and then subsequently retagged before being shipped to the next entity in the supply chain. In cases where an outbreak of shellfish related foodborne illness occurs, the tags and the accompanying log records enable tracing of the product to the original source and throughout the supply chain to identify the cause of the outbreak. However, most tags are not kept in an organized fashion, as the process of sorting and filing physical tags can again be cumbersome, which reduces the likelihood of adherence to the sorting and retention rules. Thus, when the need arises to retrace steps, the ability to trace can be hindered by disorganization.

Figure 1:
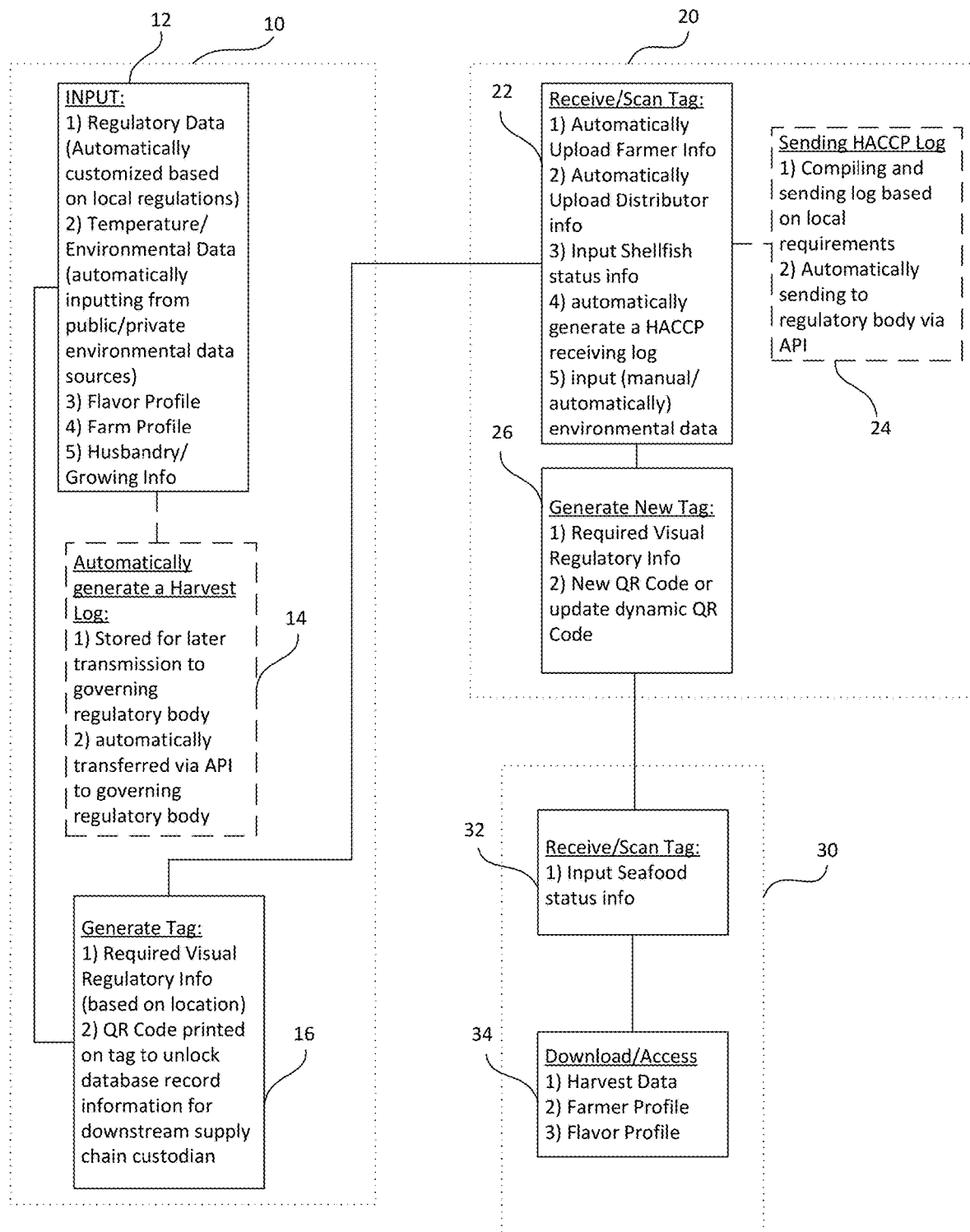
FIG. 1 illustrates a flowchart of a method of automatically tracking harvested seafood and sharing of various information from harvesting to end consumer.

FIG. 1 illustrates a flowchart of a method for automatically tracking harvested seafood from farmer/fisherman to end consumer and additionally transferring information that is not only helpful for tracking and organizing, but providing a means of educating the end consumer more fully about the given product. By illustration at the farmer/fisherman stage 10, a smartphone or other computing device can be utilized to input and subsequently upload Regulatory Data, Environmental Data, Husbandry Data, Flavor Profile Data, and Farm Profile Data into the system during step 12.

Regarding Regulatory Data, the system can automatically populate the appropriate required regulatory data based on harvesting (or distribution/transfer) location. After populating the required regulatory data fields, the system can also pre-fill some of the fields using user profile data, location, public databases and so forth. For example, a harvester of oysters can have in their profile the name of the organization, location, website, history and other information, which can be automatically pulled in each that user is generating a new tag to be associated with a shipment of oysters to be received. The system can also automatically pull in time and location information.

Certain regulatory data such as size and quantity may need to be manually input. Certain temperature readings can be automatically updated, while others are manually entered and depend on whether the given harvester has linked sensor devices. For example, a linked temperature sensor, which monitors the temperature of the harvested product as it is stored and readied to ship. Some of the regulatory data includes determining whether or not product can be harvested at a particular time based on an issued moratoriums that may exist for a given location over a given period of time. This information is often associated with a government or regulatory body database and can be automatically checked for compliance. For example, if there is a 2-week moratorium on harvesting because of red tide, and the date of the harvesting falls within the moratorium the system can alert the user, distributor and/or regulatory body for compliance purposes. These are often referred to as growing area classifications. Other automatic verifications can include confirming that the entity/farmer/harvester is on the registered list for the FDA's Interstate Certified Shellfish Shippers List—which both the sender and receiver must be if product is transported across state lines. These lists are updated monthly and if not compliant or if a registration has lapsed fines or the destruction of the product can result. The system, upon entering the next destination, whereupon the next destination is across state lines, can automatically search and confirm appropriate registration is in place. The system is configured to automatically update any regulatory rules as changes arise.

The Environmental Data can also include the date and time the product was harvested, salinity of the water, ambient temperature, the temperature of the product, tide levels, location of the harvest product, and other environmental data. Some of this information can be automatically gathered from public and private databases. Localized environmental information can be updated from data loggers that are automatically sending hourly information to the system.

Flavor Profile Data is increasingly becoming important with regards to the seafood and shellfish industries. Consumers are increasingly becoming aware that the region, season, salinity of the waters, harvest size, time from harvest and other factors affect the taste of the harvested product. Certain restaurateurs and distributors of shellfish have begun analyzing and categorizing the various flavors associated with the harvested seafood. As with wine, the taste, flavor and consistency of the product results from the changing natural environment where it is grown. Even the same shellfish in the same bay, can have a dramatically different taste and shape depending on the time of year and the method of husbandry. In the industry, this is often referred to as the Merroir. These conditions aren't complete, but are provided as an exemplary list to note the importance and value to the industry. Information at the "lot" level is an increasingly important story for consumers. For example, a story might include "the oysters were placed in the water in June of 2019. They have been handled 18 times by Joanne as she has worked to make sure they have a deep cup. The salinity of the bay this week was exceptionally high because of a Southwesterly blow. Because of the husbandry practices and environmental conditions, this particular lot of oysters is smaller with a deeper cup. They are more salty, but have our typical cucumber after taste."

It should also be noted that various pairings of wines are now dependent on the flavors of the associated harvested product. Thus, the Flavor Profile Data can include the size and shape of the product, the salinity of the waters, the likely feed (plankton) for the shellfish and other factors and suggested pairings of drinks and other foods to be consumed with the harvested product. In some cases, recommendations on how to prepare and serve can also be included.

Additionally, Farm Profile Data can be input and uploaded into the system, which can include links to historical videos and biographical information about the owners and workers of the farm, as well as pictures of the owners and workers who manage the farm. The Farm Profile Data can help end consumers and/or servers identify the source of the harvested product, and enhance the experience associated with consuming the harvested product. The Farm/harvester Profile Data can be used as a sourcing mechanism, where upon favorable or unfavorable reviews, can help increase or decrease the demand of product from a particular farm.

Husbandry Data is another set of Data that end consumers of the harvested product may be interested in. This type of data includes growing and/or harvesting techniques. For example, if the product is oysters, is it grown in cages or harvested in a natural growing environment, where does the seed come from, what time of year were they harvested, growing times, and other such data associated with the husbandry of the product.

Regulatory guidelines for tagging products do not require the Flavor Profile Data or Farm Profile Data, but as noted above, there is a value of having access to that information. As a result, this information can be input and uploaded to a database in a cloud-based system and accessed via scanning a QR Code by a networked computing device, which renders the information in a software application or in an internet browser. In one use case, the QR code is generated by the first entity using this system in the supply chain. They input and upload information about the harvested seafood product, which enables the next entity in the supply chain to access that information using a software application. That next entity can scan the QR code and then input and upload additional regulatory information pertaining to the state of the product and length of custody at their stage in the supply chain. The QR Code representing a particular lot of seafood remains the same throughout the chain of custody and is printed on the tags so that downstream entities can scan the code to determine if the tag information revealed by scanning the code meets regulatory guidelines. Often a stable lot code is generated with the associated harvested seafood product, which helps to organize and track the information in the database as information is update along the way. In some instances, a sub stable lot code is generated in the instance where a shipment is divided into smaller lots to be delivered to retailers.

Thus, once the farmer/fisherman generated a new tag for shipment, during the first step in the supply chain, that data is uploaded to the database as noted above, which enables both regulatory and non-regulatory to pass along the supply-chain, which can be revealed by scanning the QR code.

The tags can be generated during step 16 using a printer 240, such as a mobile thermal printer, configured to print on water-resistant paper, which is also generally a guideline associated with the tags, as the tags need to be able to withstand moisture and other elements during the shipping process. The generated tags can include any required visual regulatory information in addition to the scannable QR code. It should be understood that though it is referenced throughout using a QR code and that is preferred, other scannable barcodes, two-dimensional codes and so forth can be used similarly to accomplish the methods described herein. Additionally, electronic means such as RFID tags and other NFC chips could be a reasonable alternative to barcodes. Thus, the term QR code should not be construed to be a limiting term.

Each time someone new handles the harvested product in the supply chain, such as distributors 20, they can receive and scan the QR code in step 22, which similar to above loads the regulatory and non-regulatory information into their tracking system account, and enables the new entity 20 to add new regulatory information, such as time and temperature of harvested product upon arrival and then as noted above augments the database with new information which can be accessed by other downstream users, such as retailers 30, of the system by receiving and scanning the QR Code in step 32. It can also automatically pull in the second supply-chain user's information as well. This information can be transmitted from a smartphone or other networked device to a thermal printer, which can then print the updated tag during step 26, which now shows the appropriate visual regulatory information. This cycle continues until the harvested seafood product has reached its final destination, such as a grocery store or restaurant. Also similar to above, the system tracker can automatically compile and in some instances automatically send regulatory information during step 24. This is shown in dashed lines in as an optional step, and depends on local requirements.

At the final destination the end-user can scan the QR Code and access information during step 34 including the non-regulatory information, which can include the Farm Profile, Flavor Profile, Husbandry Data and even supply chain custody information that has been gathered along the way. The end-user can also have an opportunity to leave a review, which can then be received and reviewed by the farmer and/or those in the shipping channel. The restaurant or grocery store as a recipient in the supply-chain can also scan the tag, which can automatically notify the previous shipper that the harvested seafood product was received. This data can be stored in the database and accumulated for regular reporting requirements.

For example, some regulations require farmers/harvesters and dealers to submit harvest and shipment information regularly to state and federal authorities. As shown in step 14 the present system automates the transformation and transmission of that data to various databases, which can include directly sort and export that information.

Supply-chain users, which include harvesters, distributors, and retailers can have each scanned or generated tag that is associated with a given harvested seafood product shipment to be automatically tracked and associated with their business. Thus, eliminating the need to store many physical tags, and reduce the time needed to generate compliance reports. These compliance reports can include automatically generated Harvest/Landing Logs, that are often required to have on hand for a certain period of time, or in some instances to be submitted periodically. The system can compile those, store those, and certain instances automatically send them based on selected preferences using an API into the regulatory body's system.

It should also be noted that upon transitioning from harvester to the next switching point in the distribution line, upon scanning the QR code on the tag, the system can be configured to automatically generate HACCP (Hazardous Access Critical Control Point) log information, as noted above. This log information can be stored as part of compliance for the user (harvester, distributor, etc.) and sent over according to guidelines or alternatively be sent automatically upon scanning utilizing an API with the regulatory body's system.

Figure 2:
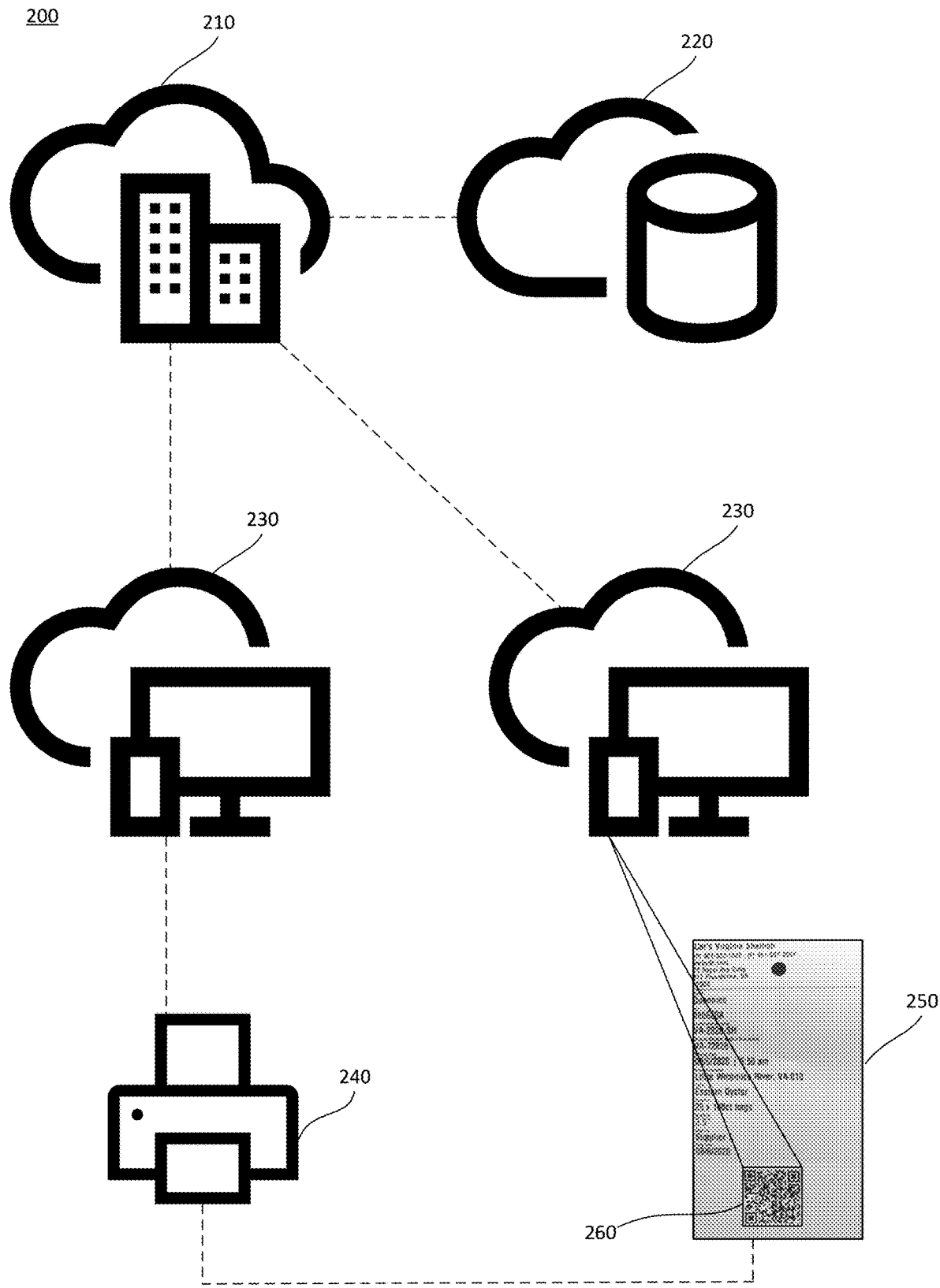
FIG. 2 illustrates a schematic of various system components associated with the method of FIG. 1 for automated tracking and sharing of harvested seafood information.

FIG. 2 illustrates a schematic of some of the tracking system 200 components that can be used to implement the methodology described above including using a smartphone device or other networked computing device 230 that has access to the internet, as well as a camera for scanning QR codes. The smartphone device 230 can access the system software, which can locally available on the smartphone, available in a cloud-based computing device 210, or implemented as a hybrid of the two. This tracking system software can be used for manually inputting or otherwise automatically gathering the regulatory and non-regulatory information, which is stored in a database 220 and associated with the harvested seafood product. Each user/company of the system can have an associated user ID that includes profile information to enable auto-filling for some of the regulatory and non-regulatory information. The tracking system software is configured to enable links, videos, pictures and biographic information, as well as reviews from end-users which can be added to the database and associated with the specific QR code. As shown, more than one smartphone or networked computing device can be used as a portal to access the information associated with the QR Code and for updating additional information to be associated therewith. As noted previously, 230 can be used to scan a printed tag 250 having a QR code 260 displayed thereon to begin accessing information associated with that QR code.

Computing device 210 can include a processor and non-volatile memory, which includes executable instructions stored thereon to perform many of the tasks already herein. Some of those tasks include receiving data from 230 and sending the received data to database 220. Other tasks include verifying the user based on received scanned information, retrieving from external databases regulatory, environmental or other externally retrieved data and associating it with a particular harvested seafood product shipment or lot. It should be noted that a networked computing device 230 can include a smartphone, tablet, laptop and other computing devices that have access to the internet and generally a camera, whether integrated or peripheral. In the instance where RFID or NFC chips are used these devices would likewise have access to a peripheral or integrated RFID or NFC reader.

Figure 3A:
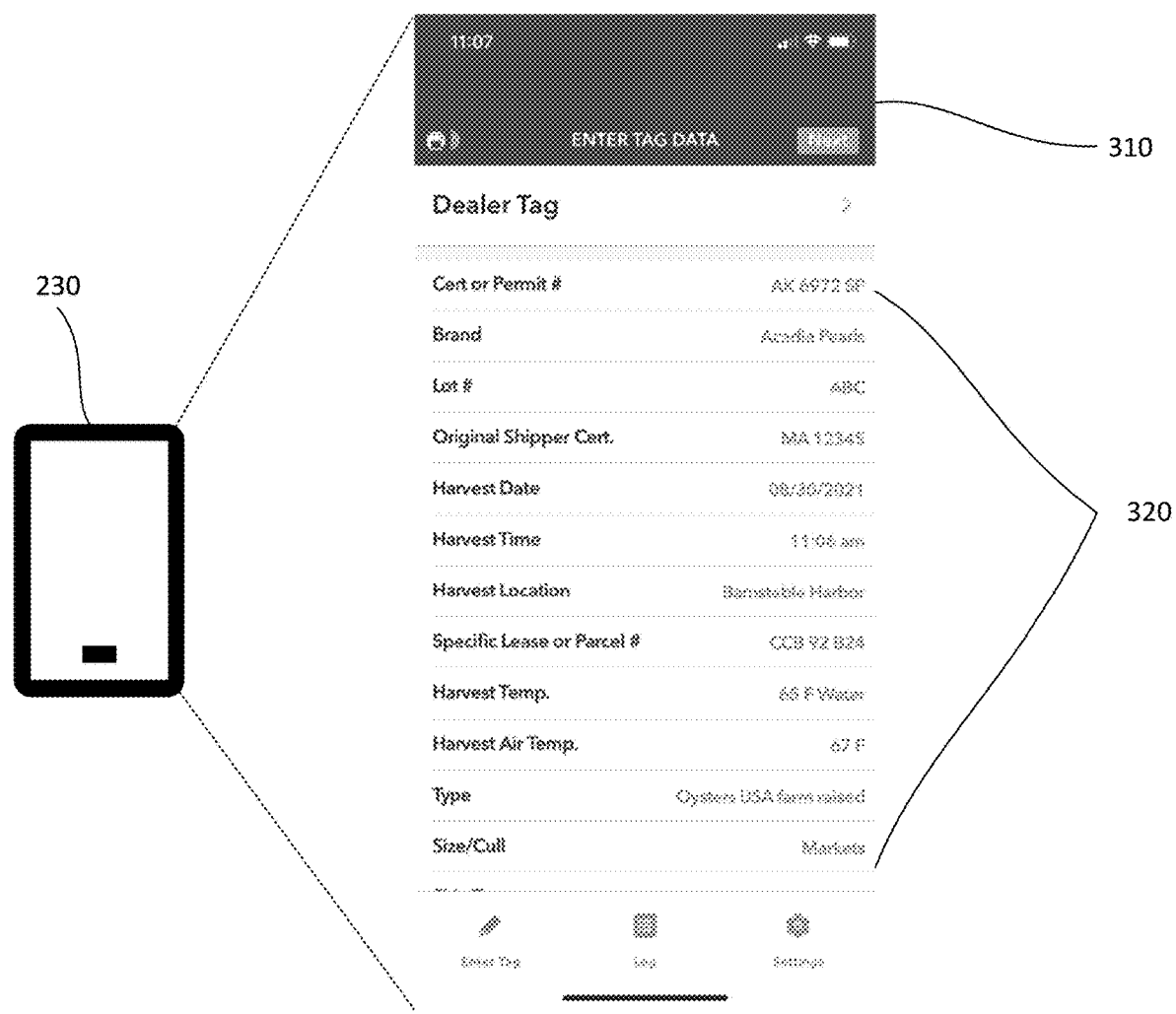
FIGS. 3A-D illustrate various interfaces associated with the generating portion of the system tracker software used for inputting and generating a harvested seafood product tag and QR Code.
Figures 3B, 3C:
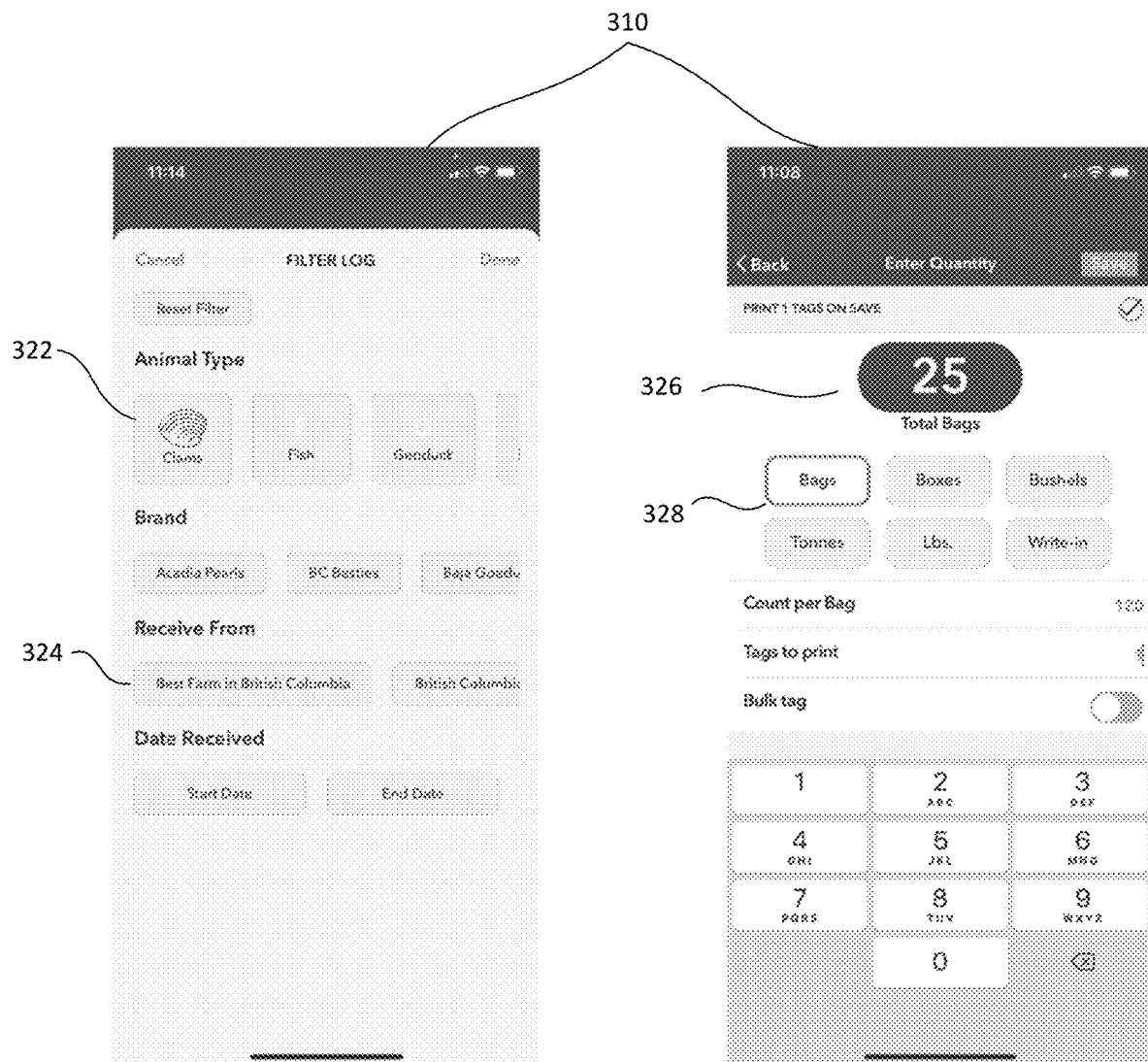
Figure 3D:
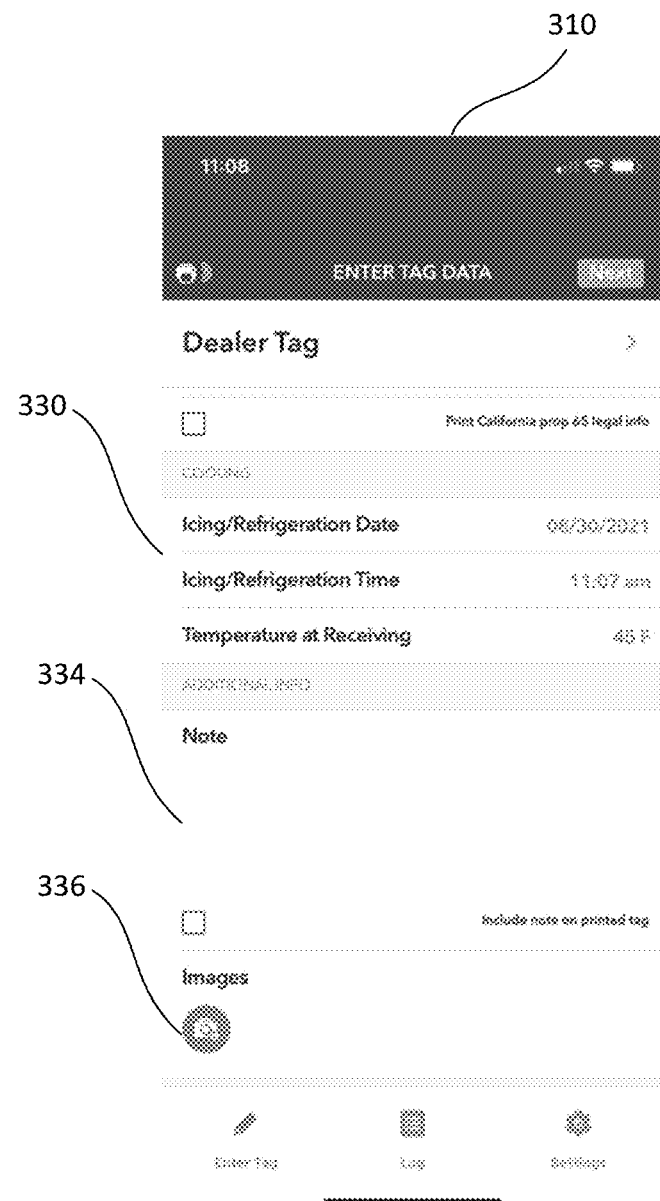
Figure 4A:
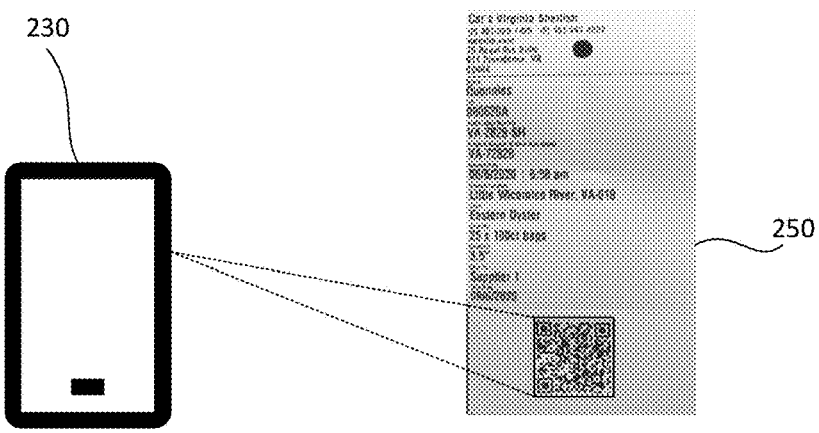
FIGS. 4A-D illustrate various interfaces associated with the receiving portion of the system tracker software used for receiving and further distributing of the harvested seafood product.
Figure 4B:
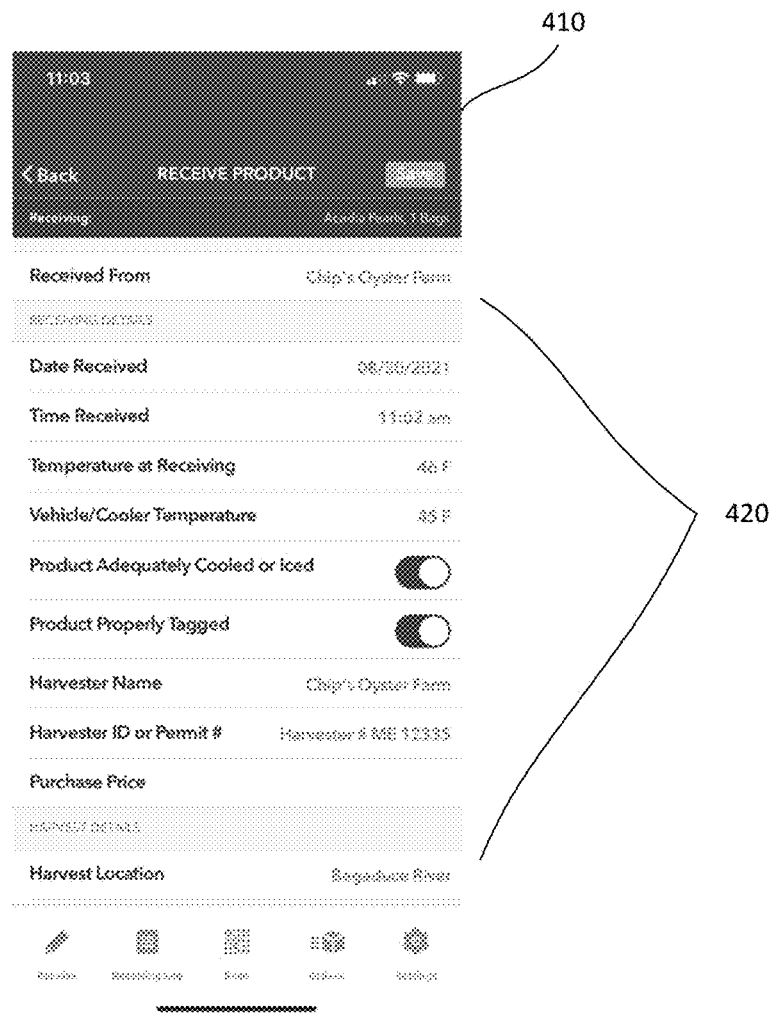
Figures 4C, 4D:
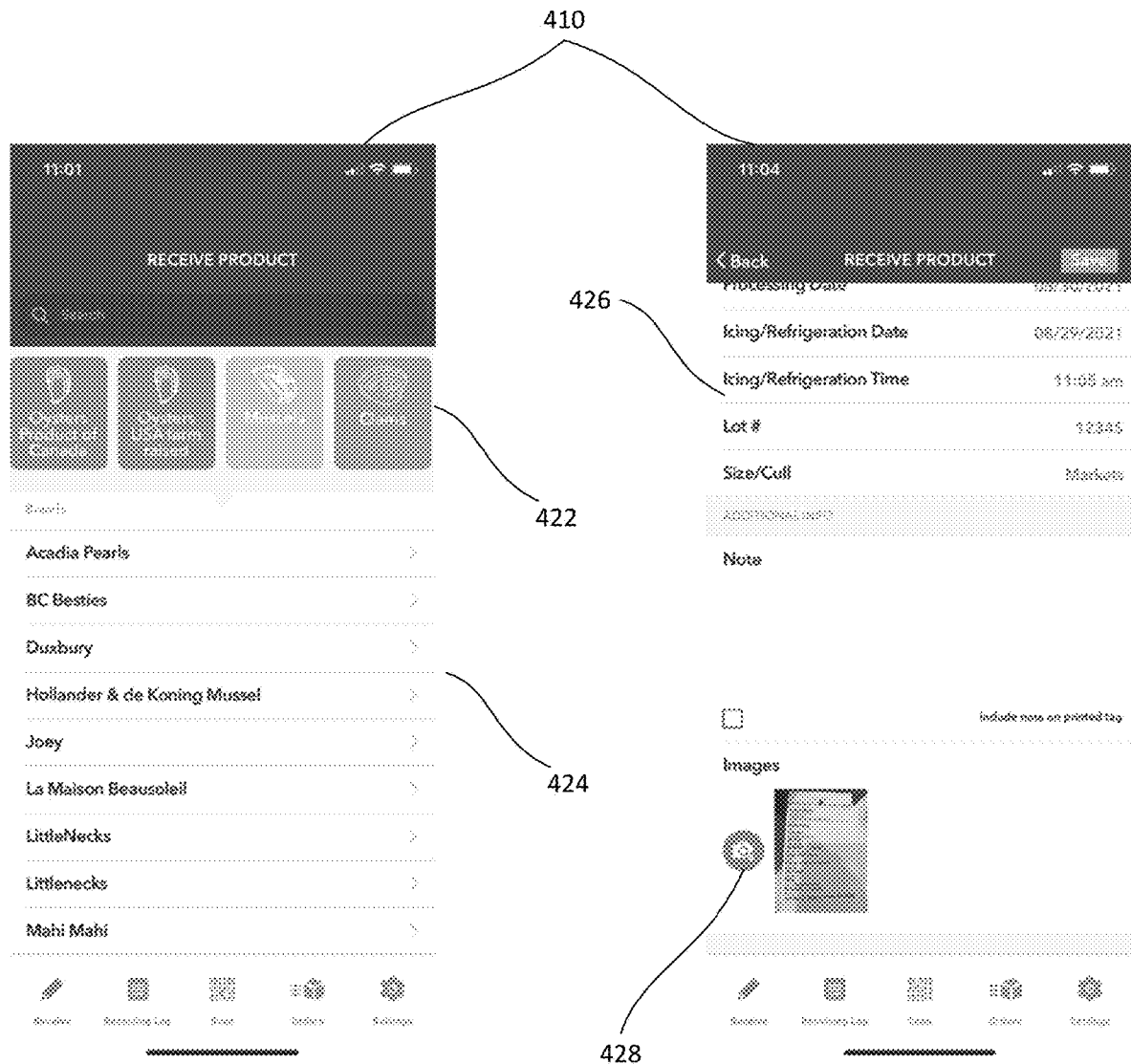

FIGS. 3A-D illustrate various interfaces associated with the generating portion 300 of the system tracker software used for inputting and generating a new harvested seafood product tags and QR Code. Displayed on the smartphone 230 is user interface 310, which can include various regulatory fields 320, some of which can be automatically generated and some of which might require manual input. FIGS. 3B-C illustrate additional views of the interface 310 that include options for filtering the type of seafood 322 to be shipped, as well as the location selection option 324 where the product was received from. Some harvesters/fisherman may have multiple types and locations from which they harvest various seafood products. In FIG. 3C, fields for quantity 326 including the container style fields 328 can be selected. FIG. 3D illustrates temperature fields 330 from the product being stored prior to shipping, as well as note field 334 that be used to generated a particular note on the tag, and a field 336 to upload images, which can be helpful in many ways and later retrieved downstream upon scanning the QR Code. Once the appropriate data fields have been inputted either through manual or automatically generated, a tag can be generated to be shipped with the harvested seafood product. It should be understood that the tag can be waterproof, it can be in the form of sticker, and come in various sizes.

FIGS. 4A-D illustrate various interfaces associated with the receiving portion 400 of the system tracker software used for receiving and possibly further distributing of the harvested seafood product. As noted, smartphone 230 can scan the QR code of the received tag 250. The user interface 410 for receiving can include much of the same information including fields for inputting regulatory information. Some of this information can be automatically transferred over, while other information, such as temperature checks and quantity may need to be manually input, or received from temperature sensors. The tracking system software can also determine the current location and gather external data information, such as environmental and local regulatory requirements. The receiving user interface can also include fields to sort the type 422 of seafood products received or anticipated to be received through a filtering system, as well as specific types 424 of the given seafood product. This is helpful in understanding how much of a given item there is on hand and for coordinating further shipping. Similar to 300, 400 includes additional temperature information fields 426 to be updated of the product upon arrival, during the transition and before departing to a new location, if it is not the final destination. Uploading picture fields 428 are also available to document the product, which can be part of the record uploaded and saved to the remote database 220.

Figure 5A:
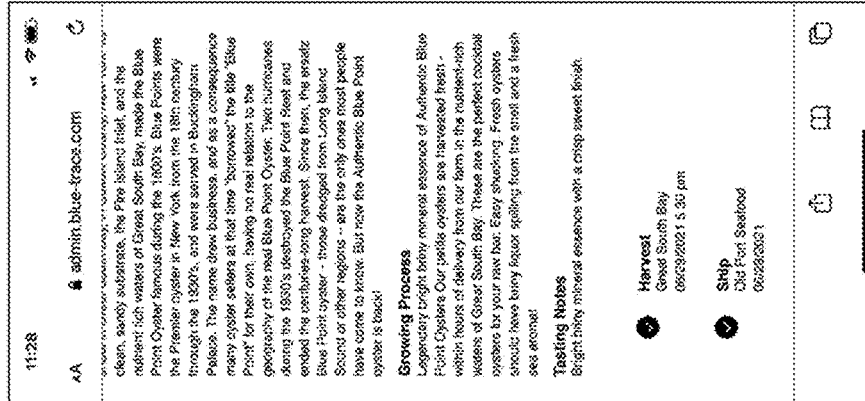
FIGS. 5A-C illustrate various interfaces associated with the consumer-end portion of the system tracker software.
Figure 5B:
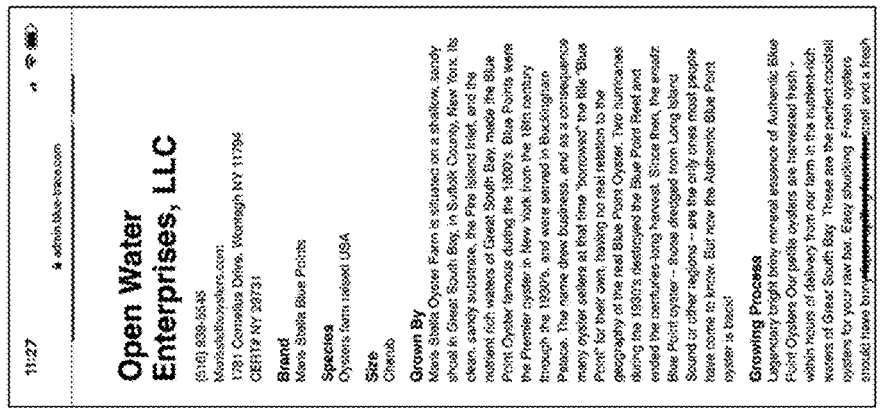
Figure 5C:
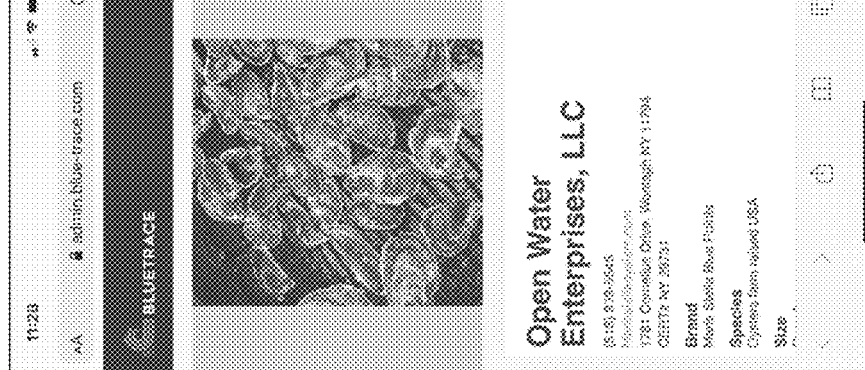

FIGS. 5A-C illustrate various interfaces associated with the consumer-end portion 500 of the system tracker software. These can display the various non-regulatory information mentioned above including information pertaining to the particular harvester/fisherman, history of the entity, husbandry of the product, recommended food pairings, such as wine pairings for the product, and so forth. This information can even guide users how to prepare the given harvested seafood product, as water salinity, type of product, time of year and many other factors can affect the product, very similar to grapes grown in various regions around the world.

Another one of the advantages of the present methods and systems include rapidly responding to any food contamination incidents. For example, if a particular restaurant prepares a seafood item where it was identified that individuals got sick from, they could rapidly make a note in the tracking system for that particular received shipment, which then becomes part of the recorded data instantly. This can trigger a warning to other locations where this particular lot of seafood may have been shipped. In the case of consumers who buy the product from the grocery store for home use, they could scan the QR code prior to use to see if the consumption recommendation has changed. As noted, the consumption rating could include a recommendation that is indicative for consuming the product raw, a recommendation that states the product needs to be cooked prior to consumption, or a warning that the product should be disposed of and not consumed. In some embodiments, anyone in the supply-chain, consumers and regulatory users can each make a note that is pushed out to those who were part of the supply chain process. Thus, helping to reduce potential additional food poisoning cases, without the need to unduly dispose of every lot of seafood. This could also help isolate potential other lots or containers of seafood that might have traveled together to be tested.

For example, if oysters traveling on a truck with clams and mussels were found to have high amounts of vibrio bacteria, the system could trigger an alert for those claims and mussels to be further tested or for a possible warning to be associated with them. It may even trigger an automatic reduction in the consumption recommendation from consuming raw to consuming only after cooking until or unless further testing verifies the safety of the lot.

As noted, depending on the type of user scanning the QR code can determine the type and amount of information available. As discussed above, harvesters that have an app or running the tracking software and have a user login can generate and track their product through the process. Distributors and Retailers can also get notifications that shipments are to arrive and see the regulatory data, because they likewise are running the tracking software application and have a distributer or retailer login, whereas the consumer who simply scans the QR code using a standard camera app on their smartphone is directed to a public browser-based website that does not include the same regulatory and shipping information. In some instances, it may include where the product traveled from.

In summarizing some of the advantages of the methods and systems described herein, it should be noted that these methods and systems increase efficiency of regulatory compliance, eliminate the need to chronologically order tags and keep on hand for a specified period of time, improve safety through multiple ways of reporting, instant alerting and updates, as well as increase marketing and product awareness not previously obtainable through the supply-chain process. With the information stored in a database and accessible from the cloud servers of the tracking system, the user can also filter and sort in additional ways that can increase productivity and eliminate waste. The user can also utilize the information for planning purposes and anticipate seasonal and other types of features, which can be useful for selling and consuming the harvested seafood product.

It should be noted the tracking software can be configured to utilize GPS information from a smartphone, IP address information, as well as any other sensor information that might be pertinent to expediting and accurately tracking the harvested seafood product.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention.

The invention claimed is:

1. A method for tracking harvested seafood product comprising the steps of:
   receiving via a first networked computing device:
      harvesting location information associated with the harvested seafood product, and
      regulatory data associated with the harvested seafood product, wherein the regulatory data to be received is determined based on the harvesting location;
   generating a first tag using a printer, wherein the first tag displays at least a portion of the regulatory information and a Quick Response (QR) code that is connected to a database;
   receiving by another user the first tag at a second location;

scanning the QR code of the received first tag with a second networked computing device;

displaying for input on the second networked computing device fields for additional regulatory information;

uploading to the database additional regulatory information to be associated with the harvested seafood product;

generating a second tag, wherein the second tag includes at least a portion of the additional regulatory information and the QR Code from the first tag.

2. The method for tracking harvested seafood product of claim 1, further comprising the step generating a second tag, wherein the second tag includes at least a portion of the additional regulatory information and the QR Code from the first tag.

3. The method for tracking harvested seafood product of claim 1, further comprising the step of accessing a database of required regulatory information based on manual entry, GPS location or IP address location associated with the first networked computing device.

4. The method for tracking harvested seafood product of claim 2, further comprising the step of storing in the database time and location information associated with the scanned first tag or second tag each time the QR code is scanned.

5. The method for tracking harvested seafood product of claim 4, further comprising the step of automatically gathering and uploading to the database at least one of: environmental data, sensor data and weather data associated with the time and location of the scanning.

6. The method for tracking harvested seafood product of claim 1, further comprising the step of automatically sending to a first user associated with generating the first tag a notification when the QR code of the first tag has been scanned.

7. The method for tracking harvested seafood product of claim 1, further comprising the step of automatically tracking shipping and receiving information associated with the harvested seafood product, wherein the shipping and receiving data is also associated with each user in a supply chain and wherein a periodic report can be generated for each user in the supply chain for each harvested seafood product handled during a specified period of time.

8. The method for tracking harvested seafood product of claim 1, further including receiving non-regulatory information associated with the harvested seafood via the first networked computing device, wherein the non-regulatory information includes at least one of: Flavor Profile Data, Farm Profile Data, Images or Videos for marketing or education purposes, and Shipping Profile Data.

9. The method for tracking harvested seafood product of claim 1, further including receiving non-regulatory information associated with the harvested seafood via the first networked computing device wherein the non-regulatory information includes consumable information associated with the harvested seafood product.

10. The method for tracking harvested seafood product of claim 9, wherein the consumable information includes recommendations on whether the harvested seafood product can be consumed raw, whether the harvested seafood product should be cooked, or whether the harvested seafood product should not be consumed.

11. The method for tracking harvested seafood product of claim 9, wherein the consumable information is pulled from the database, and wherein the database is updated by a supply-chain user or regulatory user.

12. The method for tracking harvested seafood product of claim 1, whereupon scanning the QR code triggers a release of information from the database associated with harvested seafood product, and wherein that release of information is dependent on the type of user scanning.

13. The method for tracking harvested seafood product of claim 12, wherein the type of users include: supply-chain user, regulatory user, and consumer user.

14. The method for tracking harvested seafood product of claim 13, whereupon the consumer user scanning the QR code causes the database to release only non-regulatory information associated with the harvested seafood product.

15. The method for tracking harvested seafood product of claim 13, whereupon the supply-chain user scanning the QR code causes the database to release regulatory and non-regulatory information associated with the harvested seafood product upon verifying the supply-chain user's credentials.

16. The method for tracking harvested seafood product of claim 14, wherein the consumer user enters input comment or rating to be associated with at least one of: the type of seafood, the harvester of seafood, the retailer of the seafood which is then stored in the database and further associated future harvested seafood product that is associated with the same type, harvester or retailer.

17. The method for tracking harvested seafood product of claim 1, further comprising the steps of:

receiving the second tag; and scanning the QR Code with a third networked computing device, wherein the regulatory and non-regulatory information associated with the harvested product is displayed on the third networked computing device.

18. A computer implemented system for tracking harvested seafood comprising:

a networked computer having non-volatile memory configured to execute tasks;

a database connected to the networked computer, wherein the networked computer is configured to execute the following tasks:

receiving via an input portal harvesting location information associated with the harvested seafood product, requesting regulatory data to be associated with the harvested seafood product, wherein the requested regulatory data is determined based on the harvesting location information, recording received regulatory data into the database and generating an immutable lot code to be associated therewith, generating a unique lot code to be associated with the harvested seafood product, and generating a Quick Response (QR) code to be associated with the harvested seafood product to be printed onto a tag.

19. The computer implemented system for tracking harvested seafood of claim 18, whereupon a user scanning the QR Code in the networked computer executes a function to determine whether the user is a supply-chain user, regulatory user or consumer user.

20. The computer implemented system for tracking harvested seafood of claim 19, whereupon determining the type of user scanning the QR coded associated with the harvested seafood, the networked computer retrieves user appropriate information and generates user-appropriate fields for additional input to be associated with the harvested seafood.

21. The computer implemented system for tracking harvested seafood of claim 19, whereupon determining the type of user is a supply-chain user, the networked computer automatically sends receipt information to any supply-chain user upstream in the distribution channel of the harvested seafood and records such information in the database.

22. The computer implemented system for tracking harvested seafood of claim 18, wherein the networked computer is further configured to automatically retrieve approved shippers list information from an external interstate shipper database based on entered shipping information.

23. The computer implemented system for tracking harvested seafood of claim 18, wherein the networked computer is further configured to associate non-regulatory data associated with the harvested seafood product.

\* \* \* \* \*